(12) United States Patent
Gagné

(10) Patent No.: US 9,289,092 B2
(45) Date of Patent: Mar. 22, 2016

(54) PISTON HEAD FOR FRENCH PRESS COFFEE MAKER

(71) Applicant: LES ENTREPRISES CAFECTION INC., Québec (CA)

(72) Inventor: Simon Gagné, Saint-Étienne-de-Lauzon (CA)

(73) Assignee: LES ENTREPRISES CAFECTION INC., Quebec (CA)

(*) Notice: Subject to any disclaimer, the term of this patent is extended or adjusted under 35 U.S.C. 154(b) by 347 days.

(21) Appl. No.: 13/960,238

(22) Filed: Aug. 6, 2013

(65) Prior Publication Data

US 2014/0041526 A1 Feb. 13, 2014

Related U.S. Application Data

(60) Provisional application No. 61/680,492, filed on Aug. 7, 2012.

(51) Int. Cl.
| | |
|---|---|
| *A47J 31/00* | (2006.01) |
| *A47J 31/36* | (2006.01) |
| *F04B 39/00* | (2006.01) |
| *A47J 31/20* | (2006.01) |

(52) U.S. Cl.
CPC ........ *A47J 31/36* (2013.01); *A47J 31/20* (2013.01); *A47J 31/3614* (2013.01); *A47J 31/3633* (2013.01); *F04B 39/0011* (2013.01)

(58) Field of Classification Search
CPC .............. A47J 31/3614; A47J 31/3633; F04B 39/0011; F04B 39/0016

USPC .......... 99/302 P, 297, 289 T, 289 P, 287; 417/548, 545, 552, 551

See application file for complete search history.

(56) References Cited

U.S. PATENT DOCUMENTS

| | | | | |
|---|---|---|---|---|
| 2,140,328 | A | * | 12/1938 | Mozier .............. 137/516.19 |
| 3,565,641 | A | * | 2/1971 | King ..................... 99/302 P |
| 4,632,023 | A | * | 12/1986 | King ..................... 99/302 P |
| 5,351,604 | A | | 10/1994 | King et al. |
| 5,479,849 | A | | 1/1996 | King et al. |
| 7,270,050 | B2 | * | 9/2007 | Glucksman et al. ....... 99/297 |
| 7,673,555 | B2 | * | 3/2010 | Nosler et al. ............... 99/279 |
| 7,858,135 | B2 | | 12/2010 | Radosav |
| 8,313,644 | B2 | * | 11/2012 | Harris et al. ............ 210/198.1 |

FOREIGN PATENT DOCUMENTS

| | | |
|---|---|---|
| CA | 2330615 | 8/2000 |
| CA | 2673127 | 1/2010 |
| WO | 0051478 | 9/2000 |

* cited by examiner

*Primary Examiner* — Reginald L Alexander
(74) *Attorney, Agent, or Firm* — Fasken Martineau Dumoulin LLP

(57) ABSTRACT

An attachment system for connecting a piston cover to a piston body of a french press coffee maker comprises a plate having a top surface and a bottom surface. The bottom surface of the plate is adapted to be in contact with a top surface of the piston cover. The bottom surface has at least one peg extending therefrom. The at least one peg is adapted to be inserted into at least one aperture of the piston cover and corresponding at least one aperture of the piston body. The at least one peg is adapted to be secured to the bottom surface of the piston body. Piston heads for a brewing chamber of a french press coffee maker are also presented.

10 Claims, 11 Drawing Sheets

Fig_6

PISTON HEAD FOR FRENCH PRESS COFFEE MAKER

TECHNICAL FIELD

The present relates to coffee makers and more particularly to french press coffee makers.

BACKGROUND

Industrial coffee dispensers, such as the ones commonly found in offices or shopping malls, all comprise a coffee maker controlled by a control unit. The control unit operate the dispenser to brew and deliver one or more types of coffee. In some dispensers the coffee maker is a reverse french press. A reverse french press includes a cylinder that acts as a mixing or brewing chamber and a piston. The piston travels up and down the extraction chamber to brew the coffee and deliver it to the customer. Examples of reverse french presses are disclosed in U.S. Pat. Nos. 5,351,604 and 5,479,849.

The piston includes a piston head and a piston rod pivotally mounted to the piston head. The piston head has a piston body covered by a piston cover, which ensures that the piston body is waterproofly connected to the extraction chamber. The piston is usually made of rigid polycarbonate and the piston cover of a slightly flexible polytetrafluoroethlene (PTFE). To secure the piston cover onto the piston body, a plate is disposed onto a top surface of the piston cover. A plurality of screws is inserted into apertures of the piston body and the piston cover to secure the plate to the piston body. Once assembled, the screw heads are facing an inside of the mixing chamber. As a result, the screw heads are in contact with the coffee during the brewing cycles. Over time coffee can accumulate in and around the screw heads. The coffee being difficult to clean in those areas, the piston head can become unhygienic.

Therefore, there is a need for an improved piston of a french press coffee maker.

SUMMARY

It is an object of the present to overcome at least some of the inconveniences mentioned above.

In a first aspect, a piston head for a brewing chamber of a french press coffee maker. The piston head comprises a piston body having a top portion and a skirt extending downwardly from the top portion. The top portion has a top surface and a bottom surface. The bottom surface is adapted to be pivotally connected to a piston rod. A piston cover mates at least a portion of the piston body. The piston cover has a top portion and a skirt extending downwardly from the top portion. The top portion has a top surface and a bottom surface. The bottom surface of the piston cover mates the top surface of the piston body, the skirt of the piston cover mating at least in part the skirt of the piston body. The piston head has a continuous flat top surface adapted to be in contact with an inside of the brewing chamber.

In one embodiment, the skirt of the piston body includes at least one groove. The piston head further comprises a seal disposed at least in part in the at least one groove. The seal is disposed between the piston body and the piston cover.

In one embodiment, the piston body and piston cover are each generally circular.

In one embodiment, the piston head further comprises an indentation on the skirt of the piston cover.

In one embodiment, the top surface of the piston head is the top portion of the piston cover.

In one embodiment, the piston cover connects to the piston body by suction.

In one embodiment, the piston head further comprises a holding plate. The holding plate connects to the piston cover and the piston body. The holding plate has a continuous flat top surface. At least one peg extends from a bottom surface of the holding plate through at least one aperture of the piston cover and through at least one aperture of the piston body. The at least one peg secures the holding plate to the piston body. The top surface of the piston head is a top portion of the holding plate.

In one embodiment, the top surface of the piston head is the top portion of the holding plate.

In one embodiment, the at least one peg is hollow.

In one embodiment, the piston head further comprises at least one screw. The at least one screw is inserted in the at least one peg for securing the holding plate to the piston body.

In one embodiment, the piston head further comprises at least one washer disposed between the at least one screw and the bottom surface of the piston body.

In one embodiment, the top surface of the holding plate has a raised central portion.

In one embodiment, the at least one peg includes at least two pegs. The at least one aperture of the piston cover includes at least two apertures. The at least one aperture of the piston body includes at least two apertures.

In one embodiment, the at least two pegs and the at least two apertures of the piston cover and piston body are disposed radially relative to a center of the holding plate.

There is also provided an attachment system for connecting a piston cover to a piston body of a french press coffee maker. The attachment system comprises a plate having a top surface and a bottom surface. The bottom surface of the plate is adapted to be in contact with a top surface of the piston cover. The bottom surface has at least one peg extending therefrom. The at least one peg is adapted to be inserted into at least one aperture of the piston cover and corresponding at least one aperture of the piston body. The at least one peg is adapted to be secured to the bottom surface of the piston body.

In one embodiment, the attachment system further comprises at least one screw. The at least one screw is adapted to be inserted in the at least one peg for securing the holding plate to the piston body.

In one embodiment, the attachment system further comprises at least one washer adapted to be disposed between the at least one screw and the piston body.

Additional and/or alternative features, aspects, and advantages of embodiments of the present will become apparent from the following description, the accompanying drawings, and the appended claims.

BRIEF DESCRIPTION OF THE DRAWINGS

For a better understanding of the present, as well as other aspects, and further features thereof, reference is made to the following description which is to be used in conjunction with the accompanying drawings, where.

Further details of the invention will be apparent from the detailed description included below.

DETAILED DESCRIPTION

Figure 1:
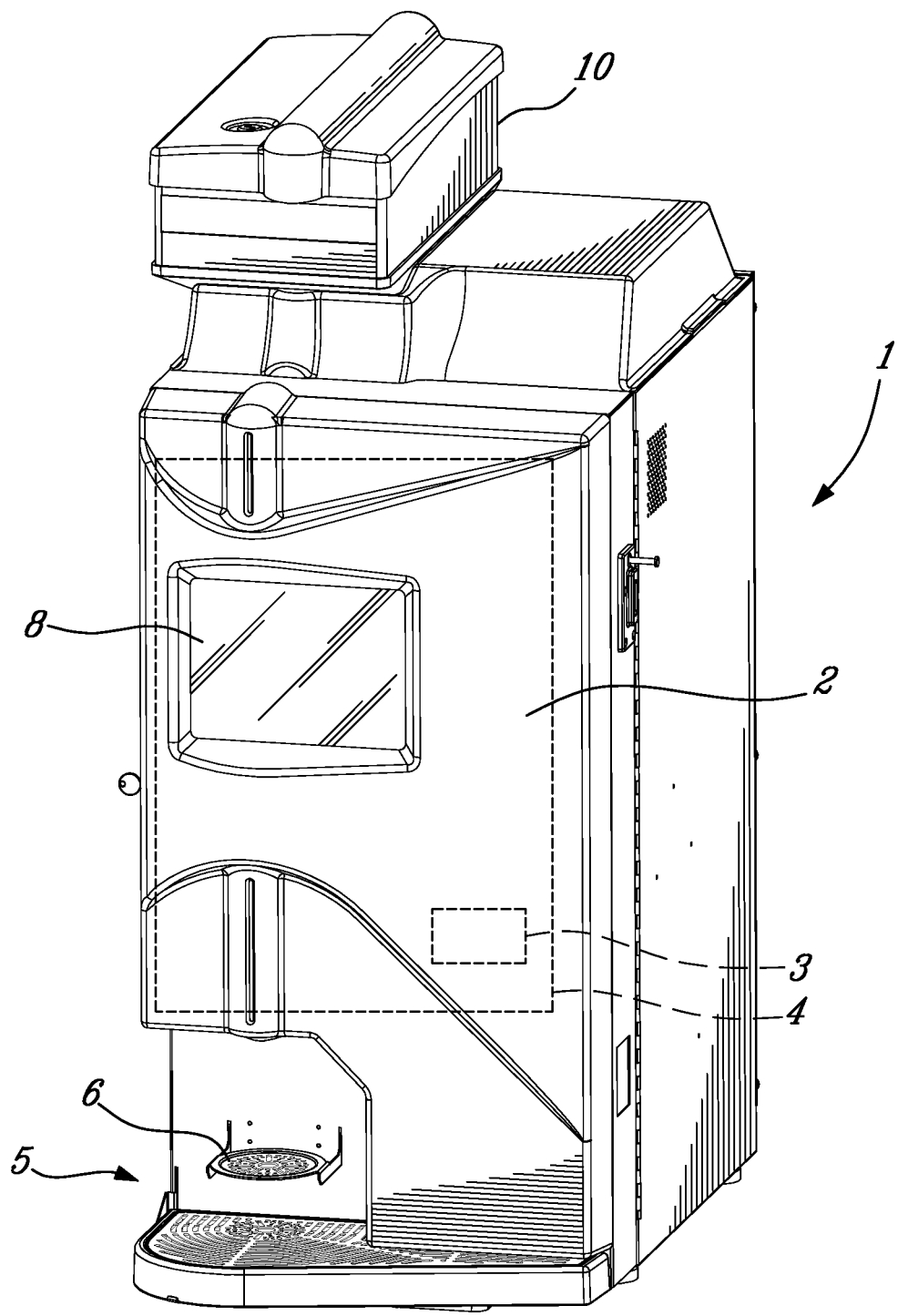
FIG. 1 is a perspective view taken from a front, right side of a coffee dispenser.

Referring to FIG. 1, a coffee maker and dispenser 1 for automatically providing a user with a real-time freshly brewed coffee is shown.

A user interface 8 is disposed on a front door 2 of the coffee dispenser 1 and is adapted to receive a selection of a desired product from the user. The user interface 8 is a touch screen where a coffee selection is displayed thereon. The user selects his/her desired item by touching the corresponding image displayed on the touch screen. It is contemplated that the user interface 8 could be any user interface allowing the user to enter a selection of a desired item. For example, the user interface 8 could be a keyboard comprising a plurality of keys to be activated by the user for entering his selection. Each key may be associated with a corresponding item. Alternatively, the user may successively depress a plurality of keys for selecting a desired item.

A product dispensing unit 4 controlled by a control unit 3 (both shown in phantom in FIG. 1) prepares in real time the coffee selected by the user on the interface 8. The control unit 3 is operatively connected to the user interface 8 and to the product dispensing unit 4 for preparing and dispensing the selected product. The product dispensing unit 4 will be described below. While the product dispensing unit 4 described herein only brews coffee, it is contemplated that the dispenser 1 could prepare in addition other types of beverages. For example, the dispenser 1 could also prepare freshly brewed tea.

A recess 5 is disposed at a bottom of the coffee dispenser 1. The recess 5 receives a platform 6. The platform 6 receives a cup thereon to collect the coffee once prepared by the product dispensing unit 4. To collect his/her coffee, the user positions the cup on the platform 6 before selecting a desired beverage using the user interface 8. Alternatively, the coffee dispenser 1 could further comprise a cup ejecting unit adapted for storing cups or containers and ejecting a cup on the platform 6 before the coffee dispenser 1 dispenses the coffee therein. It is contemplated that the coffee dispenser 1 could dispense other type of beverages in addition to coffee.

Figure 2:
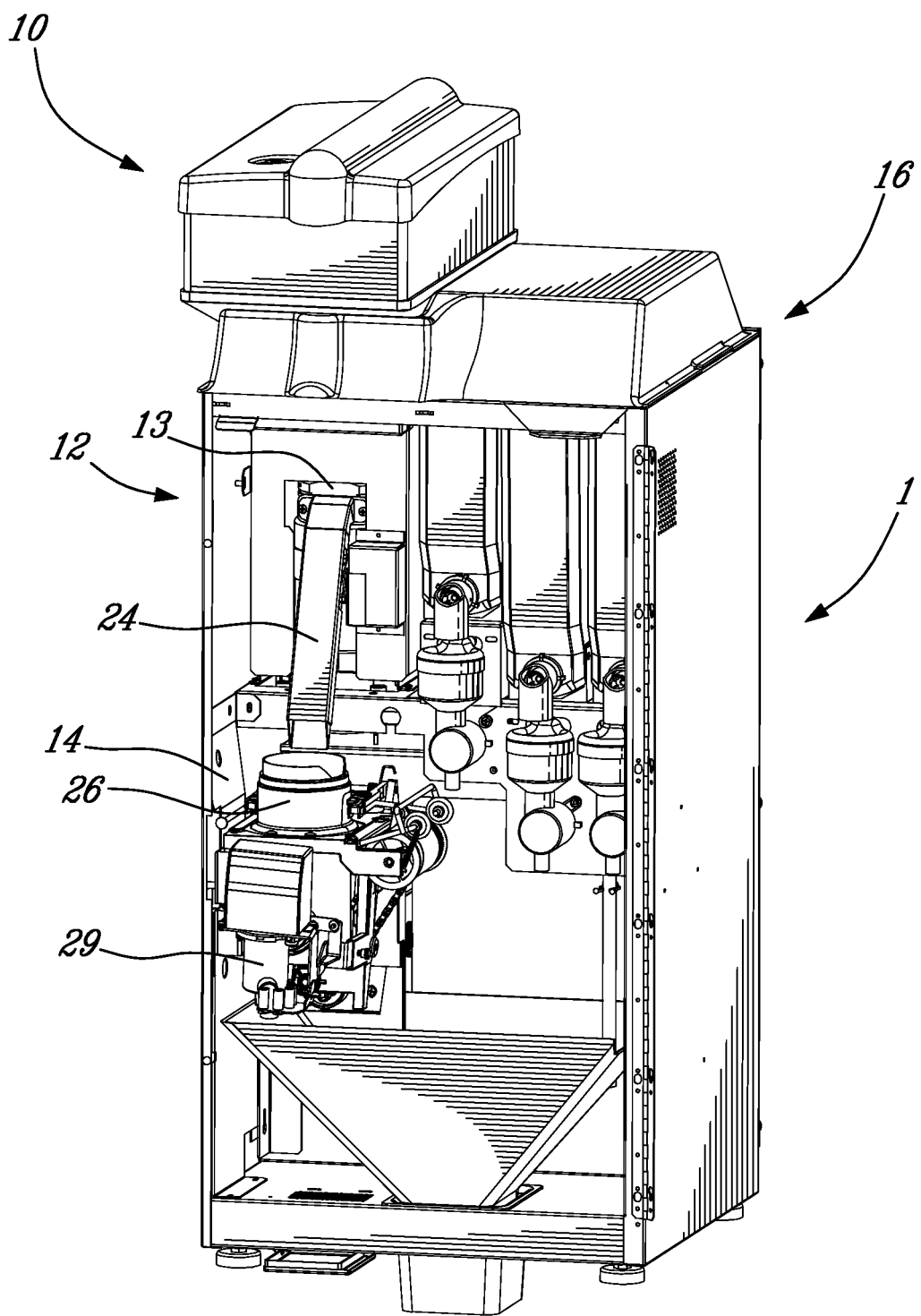
FIG. 2 is the perspective view of the coffee dispenser of FIG. 1 with a front door removed to reveal internal components.
Figure 3:
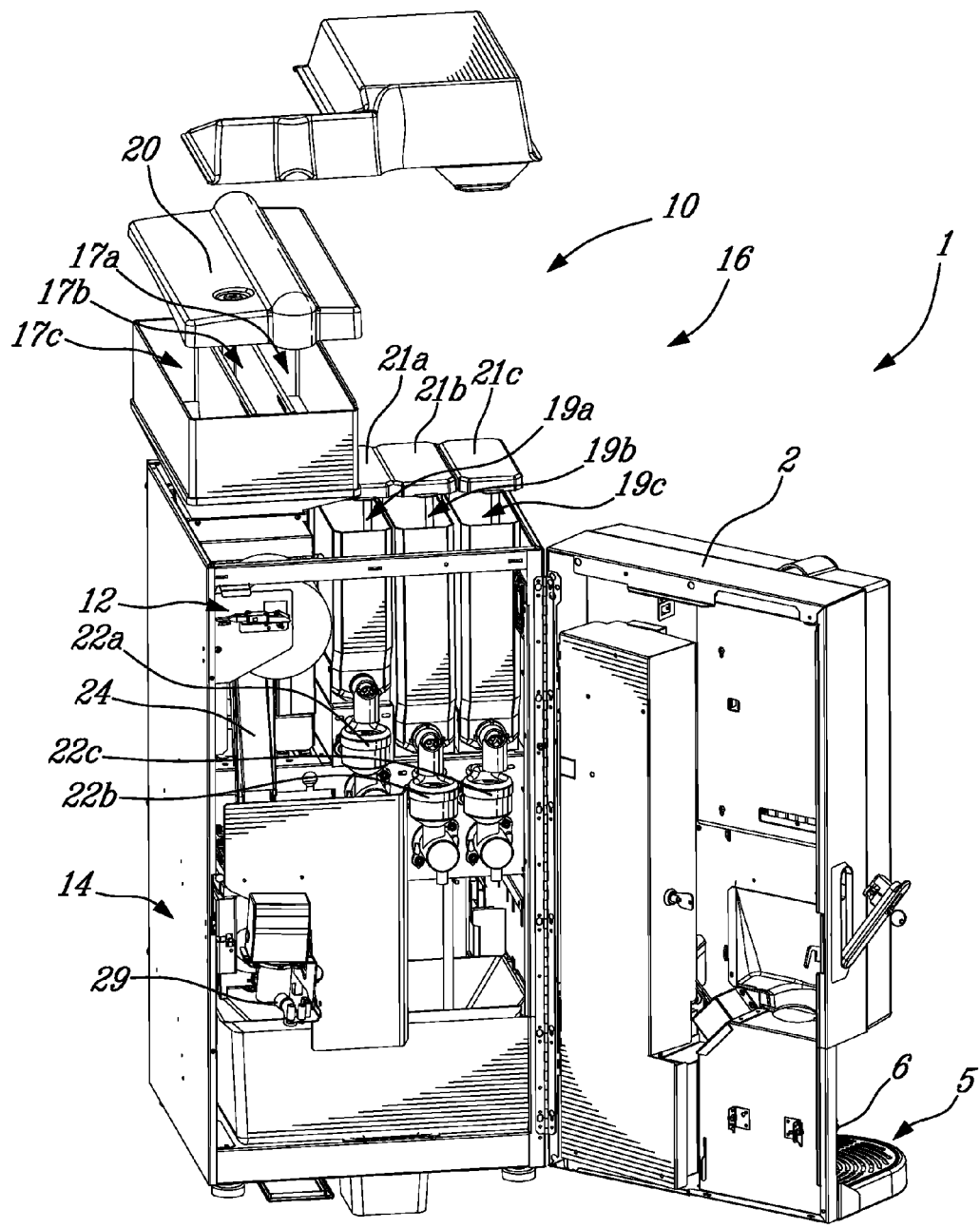
FIG. 3 is a perspective view taken from a front, left side of the coffee dispenser of FIG. 1 shown with the front door swung open and with a storage compartment shown in exploded view.

Turning now to FIGS. 2 and 3, the product dispensing unit 4 will be described. The product dispensing unit 4 includes a storage module 10, a grinder module 12, a brewer module 14, and a hot water module 16.

The storage module 10 is disposed at a top of the coffee dispenser 1 and provides bulk coffee to the grinder module 12. As best shown in FIG. 3, the storage module 10 comprises three storage compartments 17a, 17b, and 17c for storing three different types of whole bean coffees. It is contemplated that some or all of the storage compartments 17a, 17b, and 17c could include a same type of coffee. A single cover 20 encloses the coffee beans in their respective storage compartments 17a, 17b, and 17c. It is contemplated that more than one cover 20 could be used to enclose the coffee beans in their respective storage compartments 17a, 17b, and 17c. It is also contemplated that the cover 20 could cover only partially a top of the storage compartments 17a, 17b, and 17c. It is also contemplated that the storage compartments 17a, 17b and 17c could receive already ground coffee and the grinder module 12 be omitted.

The storage module 10 further includes three storage compartments 19a, 19b, and 19c for storing soluble products. The storing soluble products include chocolate powder, soluble milk powder, and soluble vanilla flavor powder respectively. These can be added to the coffee upon selection by the user on the user interface 8. Three different covers 21a, 21b, and 21c are used for covering the storage compartments 19a, 19b, and 19c. It is contemplated that only one or two of the covers 21a, 21b, and 21c could be used to cover the storage compartments 19a, 19b, and 19c. It is contemplated that the storing soluble products could include more or less than the products recited above. Three mixing chambers 22a, 22b, and 22c containing the soluble products are each connected to their associated storage compartment 19a, 19b, and 19c via a valve (not shown). Each valve is controlled by the control unit 3 for delivering a given amount of soluble product in its corresponding mixing chamber 22a, 22b, and 22c. The mixing chambers 22a, 22b, and 22c are fluidly connected to the hot water module 16 so that hot water may be delivered to each of the mixing chamber 22a, 22b, and 22c so as to mix with the corresponding soluble product. It is also contemplated that the soluble products could not be offered as a selection for the coffee dispenser 1 such that the compartments 19a, 19b, and 19c, covers 21a, 21b, and 21c and mixing chambers 22a, 22b, and 22c would be omitted.

The grinder module 12 is selectively connected to the storage compartments 17a, 17b, and 17c via a movable door (not shown) positioned between each storage compartment 17a, 17b, and 17c and the grinder module 12. A motor (not shown) is associated with each movable door. The control unit 3 controls an opening of each movable door for controlling the amount of coffee beans to be delivered to the grinder module 12.

The grinder module 12 includes a grinder 13 (shown in FIG. 2) which grinds the coffee beans delivered by the storage compartment 17a, 17b, and 17c. A chute 24 delivers the ground coffee to the brewer module 14. The brewer module 14 will be described in details below.

The hot water module 16 comprises a heater (not shown) controlled by the control unit 3 to heat the water, a tank (not shown) for storing the hot water, and accessories (not shown) for delivering the hot water. The accessories may include a pump. The hot water module 16 is adapted to be connected to a water source. The hot water module 16 is accessible via a rear panel (not shown) opposite to the front door 2.

Once the coffee has been brewed in the brewer module 14 in a manner which will be described below, a fluidic connection 29 carries the coffee to the recess 5 at a point disposed vertically above the platform 6. The brewed coffee is then delivered into a cup (not shown) positioned on the platform 6.

Figure 4:
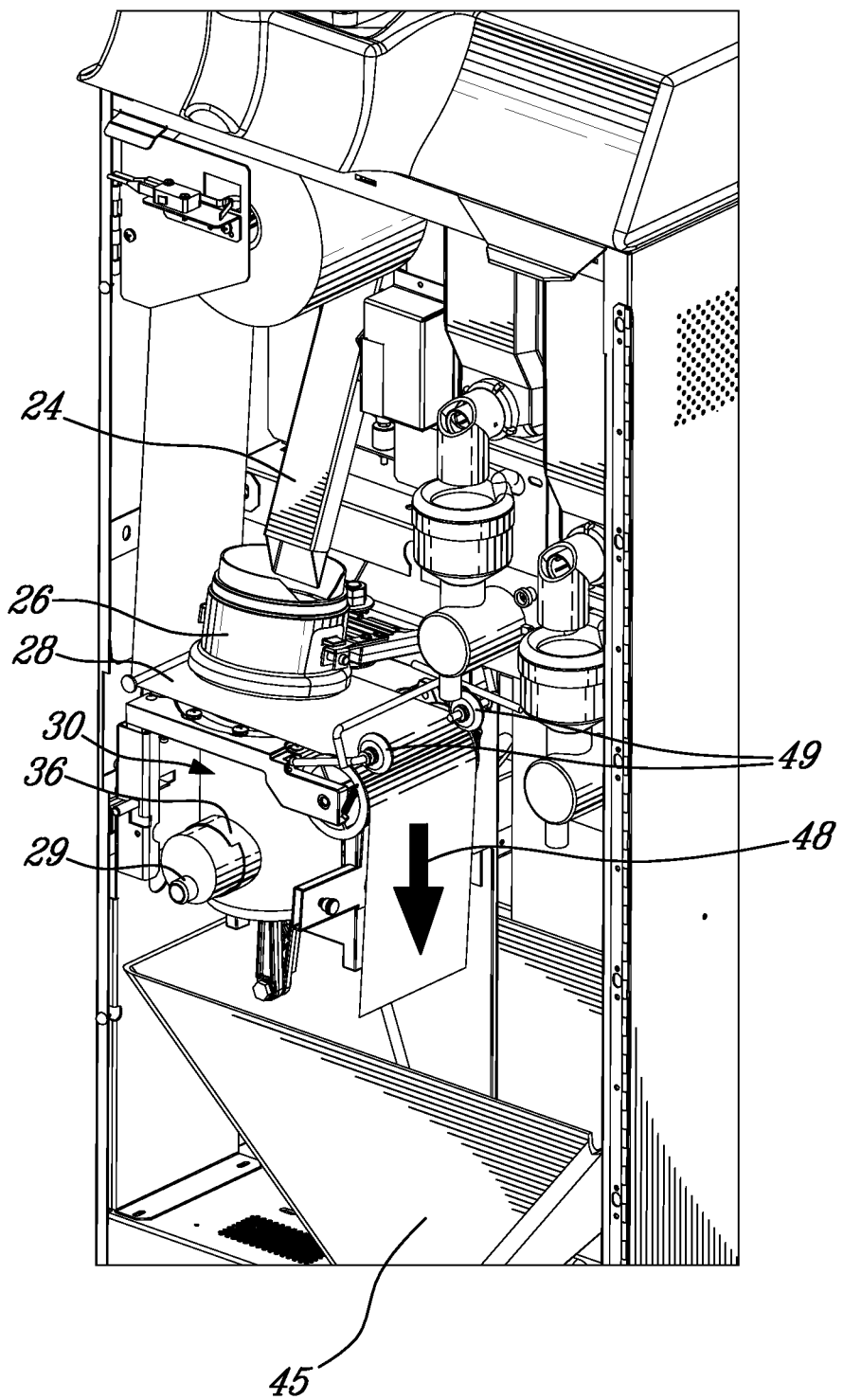
FIG. 4 is a close up view in perspective taken from a top, front, right side of a brewing module of the coffee dispenser of FIG. 1.
Figure 5:
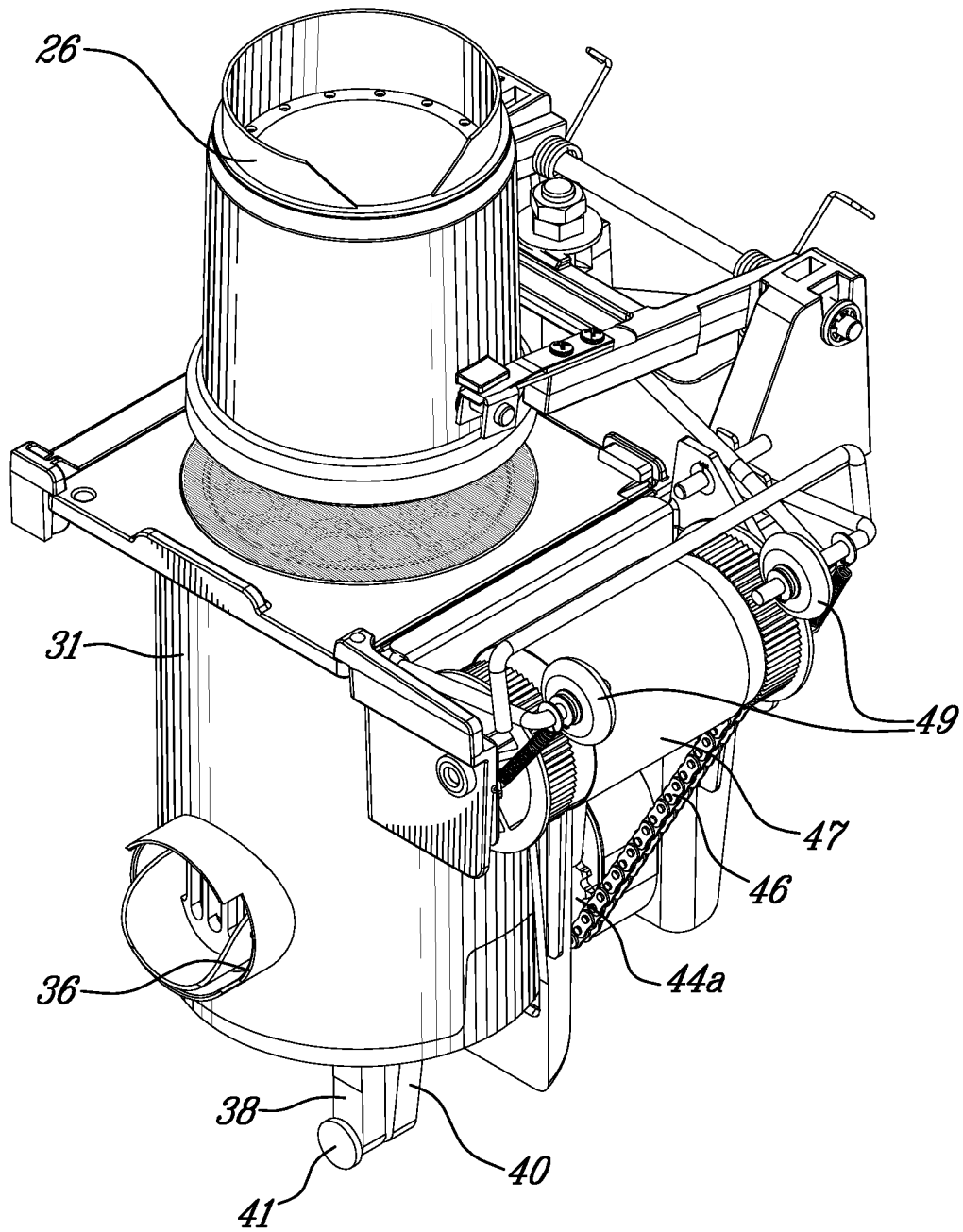
FIG. 5 is a perspective view taken from a front, top, right side of the brewing module of FIG. 4 shown with a filter paper removed for clarity.
Figure 6:
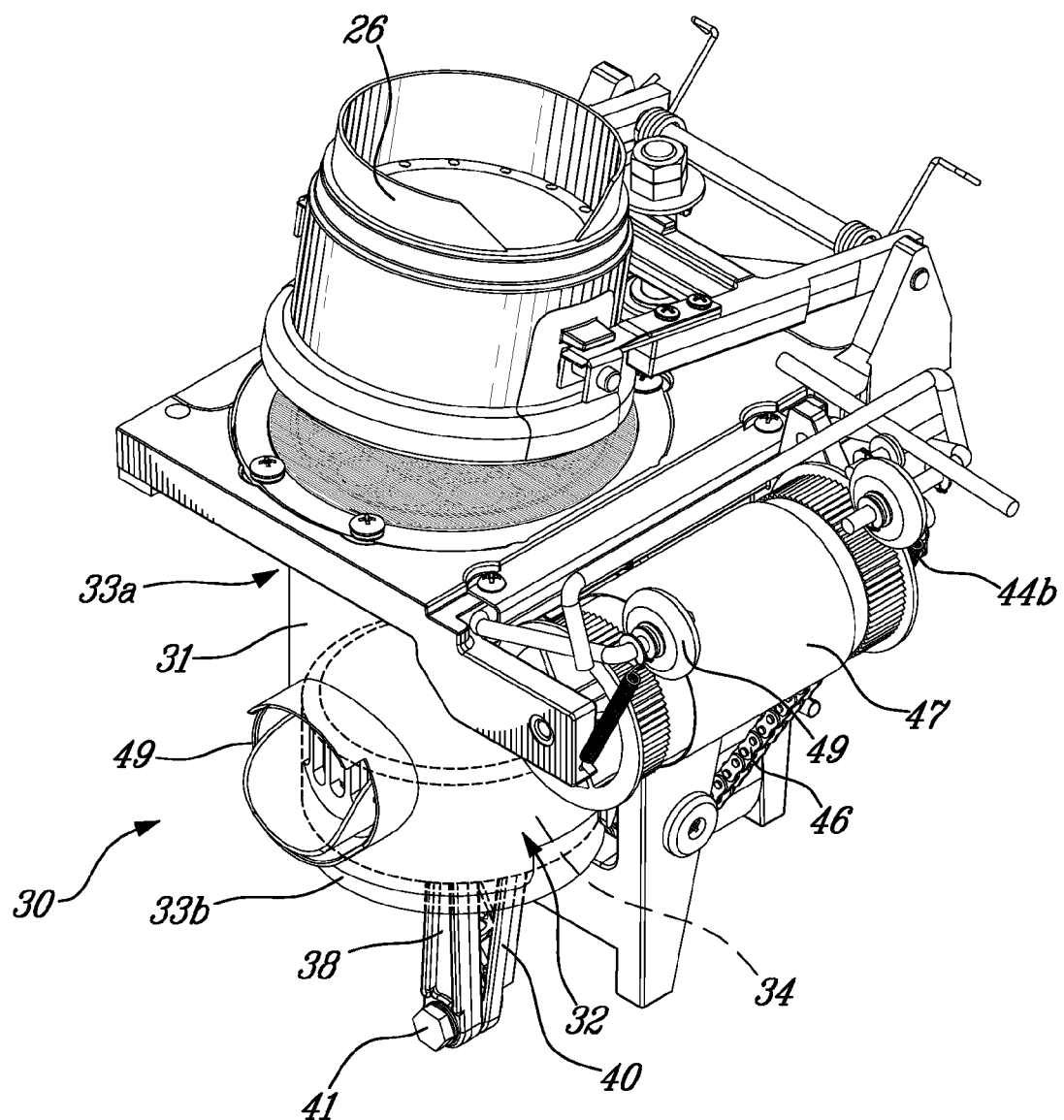
FIG. 6 is the brewing module of FIG. 5 with a mixing chamber partially shown in transparency and a piston head in dotted lines for clarity.

Referring more specifically to FIGS. 4 to 6, the brewer module 14 will now be described. The brewer module 14 is a reverse french press and only certain mechanical aspects of the brewer module 14 will be described in detail herein.

The brewer module 14 includes a funnel 26, a roll of filter paper 28, a mixing chamber 30, and a piston 32.

The funnel 26 is disposed vertically below the chute 24. The funnel 26 receives freshly ground coffee from the grinder module 12 and hot water from the hot water module 16.

The mixing chamber 30 is disposed vertically below the filter paper 28. The mixing chamber 30 has a cylindrical wall 31 and an open top 33a receiving the coffee mixed with the hot water that has passed through the filter paper 28. The mixing chamber 30 is closed at a bottom 33b by the piston 32 which is movable in translation relative to the cylindrical wall 31. The vertical motion of the piston 32 within the mixing chamber 30 accomplishes the brewing cycle. A discharge opening 36 is disposed toward the bottom 33b of the mixing chamber 30 and delivers the coffee to the fluidic connection 29 once a brewing cycle has been completed. The brewing cycle will be described in detail below.

Figure 7:
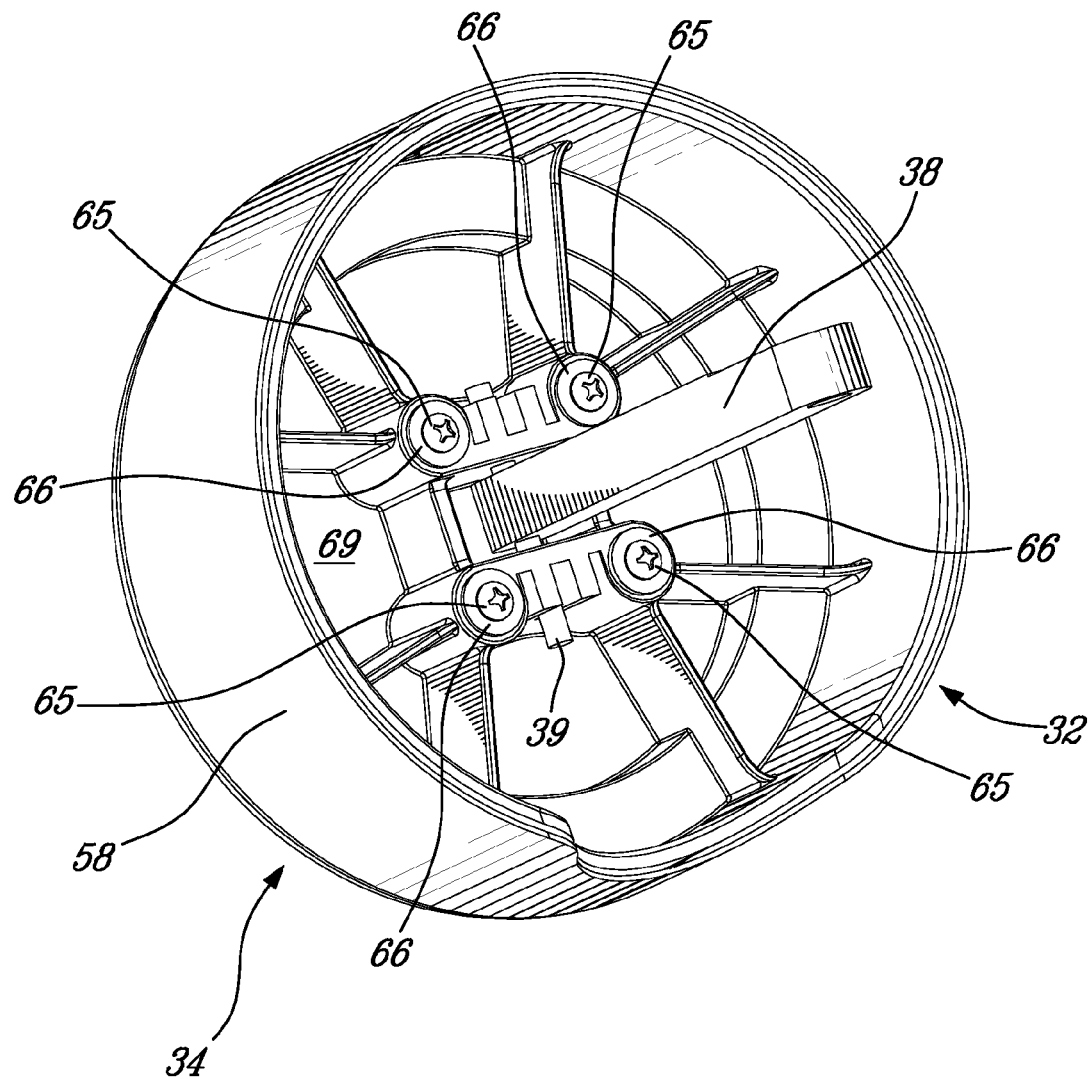
FIG. 7 is a bottom view of a piston and of a portion of a piston rod of the brewing module of FIG. 5.
Figure 8:
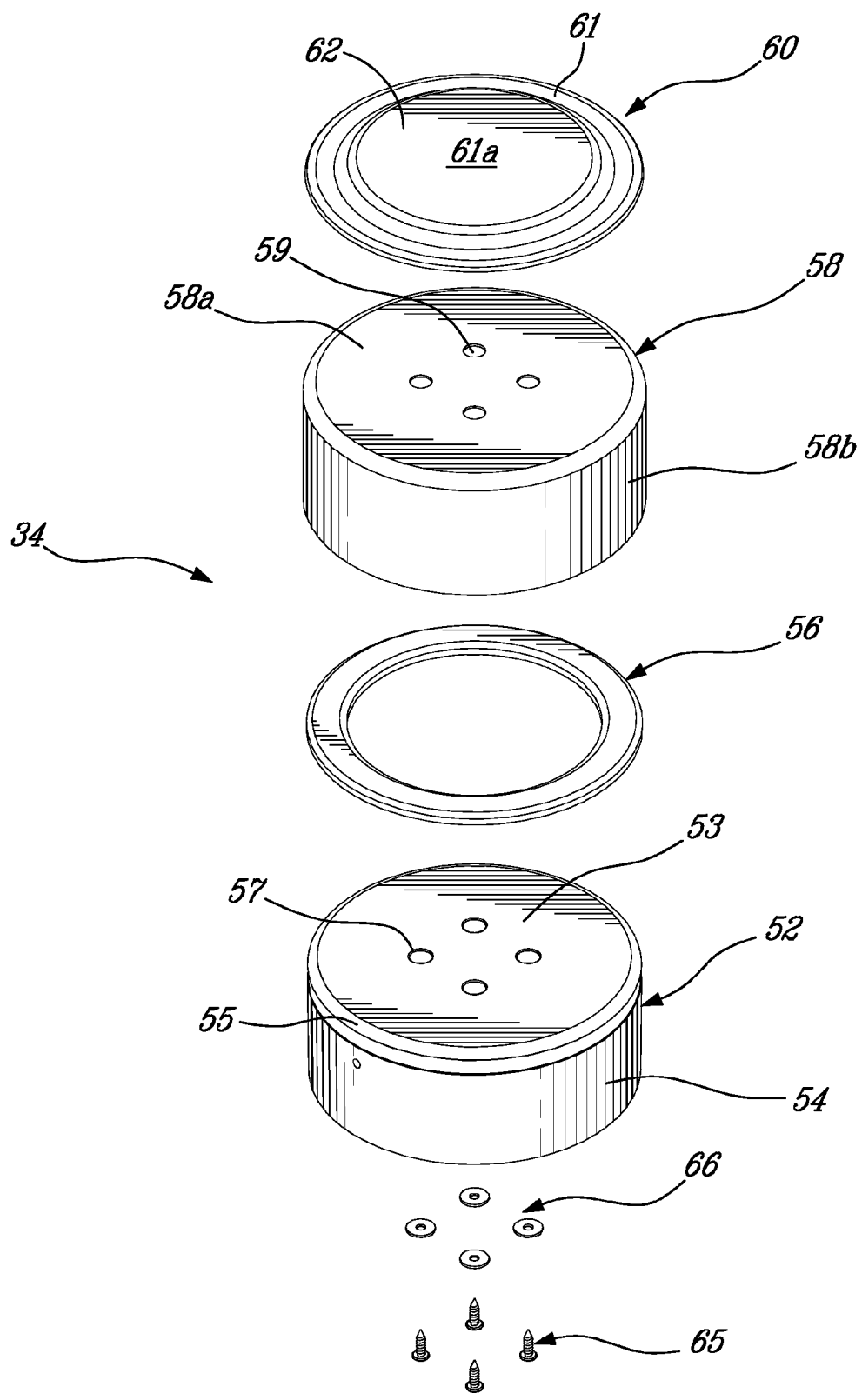
FIG. 8 is an exploded view of a piston body, a piston cover, and an attachment system of the piston of FIG. 7 according to a first embodiment.
Figure 9:
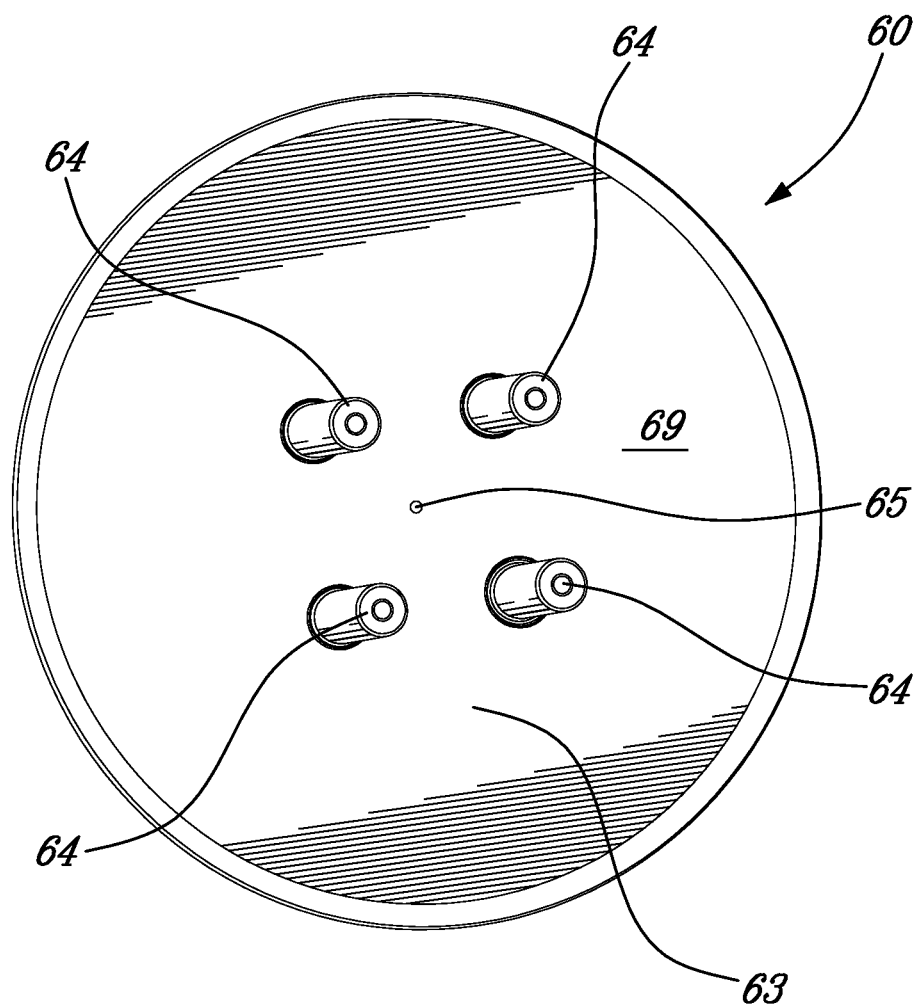
FIG. 9 is a bottom view of the piston cover of FIG. 8.

The piston 32 includes a piston head 34 and a piston rod 38. The piston rod 38 is pivotally connected to the piston head 34 by a pin 39 (shown in FIG. 7) at one end thereof. The piston rod 38 is pivotally connected to a crank arm 40 by a pivot pin 41 (shown in FIG. 6) on an other end thereof. The crank arm 40 is mounted on a shaft 42 which is engaged in rotation by a motor (not shown). Through its rotation, the shaft 42 serves as a center of rotation for the crank arm 40 which moves around it. The motion of the crack arm 40 induces a motion of the piston rod 38 which in turn moves the piston head 34 vertically inside the cylindrical wall 31. Embodiments of the piston head 34 will be described in detail below.

A first sprocket 44a (shown in FIG. 6) is fixedly connected to the shaft 42 and rotates as the shaft 42 is being rotated by the motor. An endless chain 46 is engaged on the first sprocket 44a moves as a result of the first sprocket 44a being rotated. The endless chain 46 is also engaged on a second sprocket 44b (shown in FIG. 6). The second sprocket 44b is entrained in rotation by the endless chain 46. The second sprocket 44b is fixedly connected to a drum 47 which receives a portion of the filter paper 28. A pair of rolls 49 disposed on top of the filter paper 28 vertically above the drum 47 is spring loaded to force the filter paper 28 toward the drum 47. When the second sprocket 44b is rotated by the endless chain 46, the drum 47 is forced to rotate which in turn forces the filter paper 28 to advance (as shown by arrow 48 in FIG. 4). A garbage collector 45 disposed vertically below the drum 47 collects the discarded coffee and filter paper 28. A cam (not shown) is detachably connected to the second sprocket 44b. A shape of the cam is designed so that once the brewing cycle is accomplished, the funnel 26 is moved away from the filter paper 28 to enable the filter paper 28 to advance of a predetermined amount as the cam moves back to a position it had at a beginning of the brewing cycle, so that a clean portion of the roll of filter paper 28 is disposed below the funnel 26 for the next brewing cycle.

The brewing cycle is as follows. At a beginning of the brewing cycle the piston head 34 is disposed about halfway of the mixing chamber 30, above the discharge opening 36. The control unit 3 forces the piston head 34 to move upwards via a command to the motor. The upward movement of the piston head 34 pushes air toward the funnel 26 which increases mixing of the ground coffee with the hot water. The control unit 3 commands the motor to rotate the shaft 42 in the other direction so as to force the piston head 34 to move downwards back to the position it had at the beginning of the brewing cycle. The downward movement of the piston head 34 entrains the brewed coffee into the mixing chamber 30. The control unit 3 further commands the motor to rotate the shaft 42 so as to lower the piston head 34 further relative to the mixing chamber 30 until the piston head 34 is positioned below the discharge opening. The brewed coffee is then discharged to the fluidic connection 29, the cam forces the filter paper 28 to advance and a new brewing cycle can begin.

The coffee dispenser 1 may include more or less components than described above. For example, the coffee dispenser 1 could include sensors for monitoring the functioning of the different components.

Turning now to FIGS. 7 to 10, the piston head 34 according to a first embodiment will be described. The piston head 34 is shaped to be congruent with an inside of the cylindrical wall 31 of the mixing chamber 30. The piston head 34 connects waterproofly with the inside 31a of the mixing chamber 30 such that coffee as it is being brewed does not leak between the piston head 34 and the cylindrical wall 31.

The piston head 34 includes a piston body 52. The piston head 52 has a substantially flat round top 53 and a cylindrical skirt 54 extending downwardly from the top 53. The top 53 includes four apertures 57. The cylindrical skirt 54 includes an annular groove 55 disposed toward a top thereof. A silicone seal 56 is partially received inside the annular groove 55. The seal 56 ensures contact with the cylindrical wall 31 to prevent coffee leak. The piston body 52 is rigid and made of polycarbonate. It is contemplated that the piston body 52 could be made of a material other than polycarbonate. For example, the piston body 52 could be made of any kind of rigid plastic. It is also contemplated that the piston body 52 could be at least in part flexible. It is contemplated that the annular groove 55 could be disposed elsewhere on the cylindrical skirt 54. For example, the annular groove 55 and seal 56 could be disposed about half way through the on the cylindrical skirt 54. It is contemplated that the seal 56 could be made of an elastic material other than silicone. For example, the seal 56 could be made of rubber. It is also contemplated that the cylindrical skirt 54 could have more than one annular groove 55 to receive more than one seal 56. It is contemplated that the annular groove 55 and seal 56 could be omitted.

The piston body 52 and the seal 56 are covered by a piston cover 58. The piston cover 58 has a shape generally congruent with a shape of the piston body 52, so as to fit or snug around the piston body 52 in a tight manner. The piston cover 58 includes a flat round top 58a and a cylindrical skirt 58b extending downwardly therefrom. The flat round top 58a is non-perforated and as such constitutes a continuous surface. The cylindrical skirt 58b includes an indentation 59. The indentation 59 eases fitting of the piston cover 58 onto the piston body 52. It contemplated that the indentation 59 could be omitted. It is also contemplated that the cylindrical skirt 58b could have two or more indentations.

The piston cover 58 is made of thermoformed polytetrafluoroethylene (PTFE). It is contemplated that the piston cover 58 could be made of a material other than PTFE. Given that the piston head 34 travels back and forth in contact with the cylindrical wall 31, such material would have a low friction coefficient, and would be resistant to wear. The piston cover 58 includes four apertures 59 which coincide with the apertures 57 of the piston body 52. Although the piston cover 58 is shown in the Figures to have the skirt 58b covering entirely the skirt 54 of the piston body 52, the piston cover 58 could have the skirt 58b shorter than the skirt 54.

Figure 10:
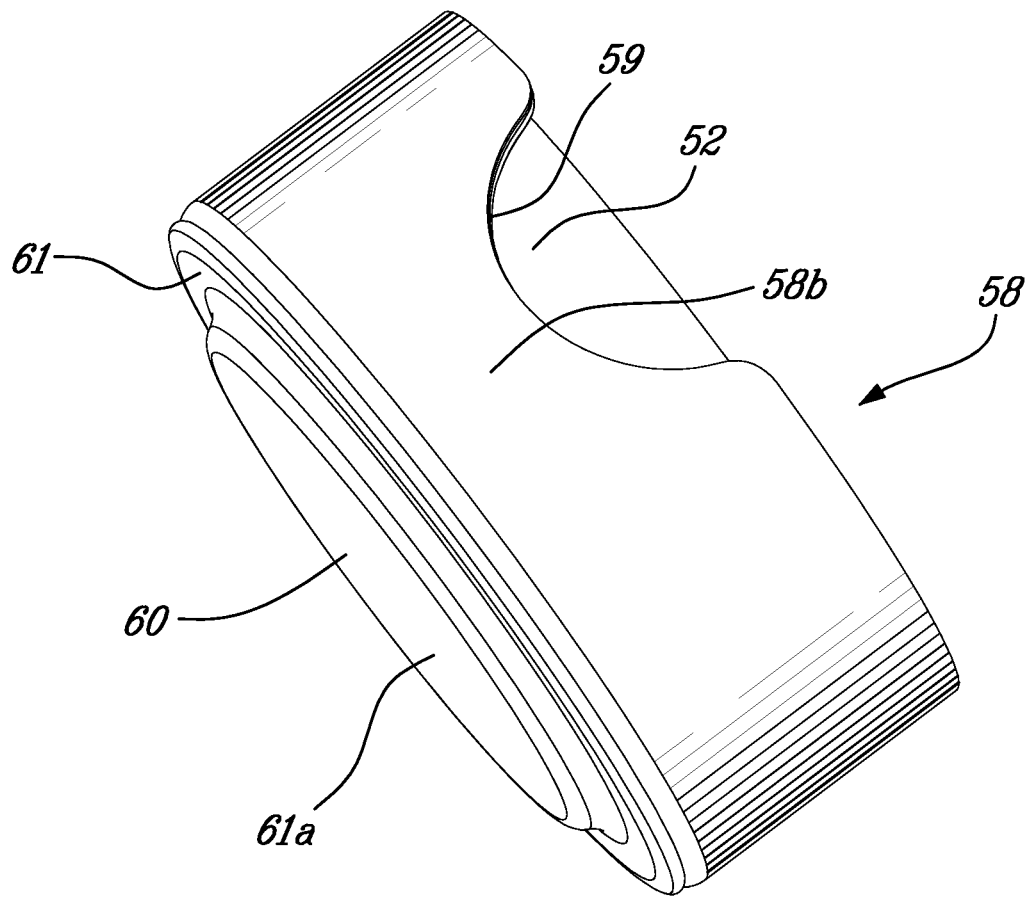
FIG. 10 is a perspective view of the piston body, piston cover, and attachment system of FIG. 8 shown assembled to each other.

An attachment system for securing the piston cover 58 to the piston body 52 includes a holding plate 60, screws 65 and washers 66. The holding plate 60 is made of polycarbonate. Other materials for the holding plate 60 are contemplated. The holding plate 60 includes a substantially flat body 62 having a top surface 61 and a bottom surface 63. As best shown in FIG. 10, the body 62 has a diameter slightly shorter than a diameter of the top 58a of the piston cover 58. It is contemplated that the flat body 62 could be shorter than shown in the Figures. The top surface 61 includes a raised portion 61a. It is contemplated that the raised portion 61a could be omitted. Four pegs 64 (shown in FIG. 9) extend downwardly from the bottom surface 63. The pegs 64 are to be inserted in the apertures 59 of the piston cover 58 and in the apertures 57 of the piston body 52. The four pegs 64 are located toward a center 65 of the holding plate 60 and are disposed radially around the center 65. It is contemplated that the four pegs 64 (and as a consequence the apertures 57 and 59) could be located away from the center 65 and/or not be disposed radially around the center 65.

The pegs 64 are hollow and are secured to a bottom surface 69 (shown in FIG. 7) of the piston body 52 by the screws 65 and washers 66. It is contemplated that the pegs 64 could be full and that a mechanism other than the screws 65 and washers 66 could be used to secure the holding plate 60 to the piston body 52. For example, the pegs 64 could be threaded and extend beyond the bottom surface 69 of the piston body 52. Nuts could be connecting the pegs 64 to the piston body 52.

As best seen in FIG. 10, once assembled, the top surface 61 of the holding plate 60 is the surface in contact with the coffee when it is being brewed in the mixing chamber 30. As such, once the holding plate 60 is assembled to the piston body 52 and piston cover 58, no screws or screw heads are in direct contact with the coffee. In turn, bacterial contamination is reduced and cleaning is eased. It is contemplated that the piston head 34 could have more or less than four apertures 57, 59 and pegs 64. For example the piston head 34 could have only one aperture 57, 59 and peg 64.

Figure 11:
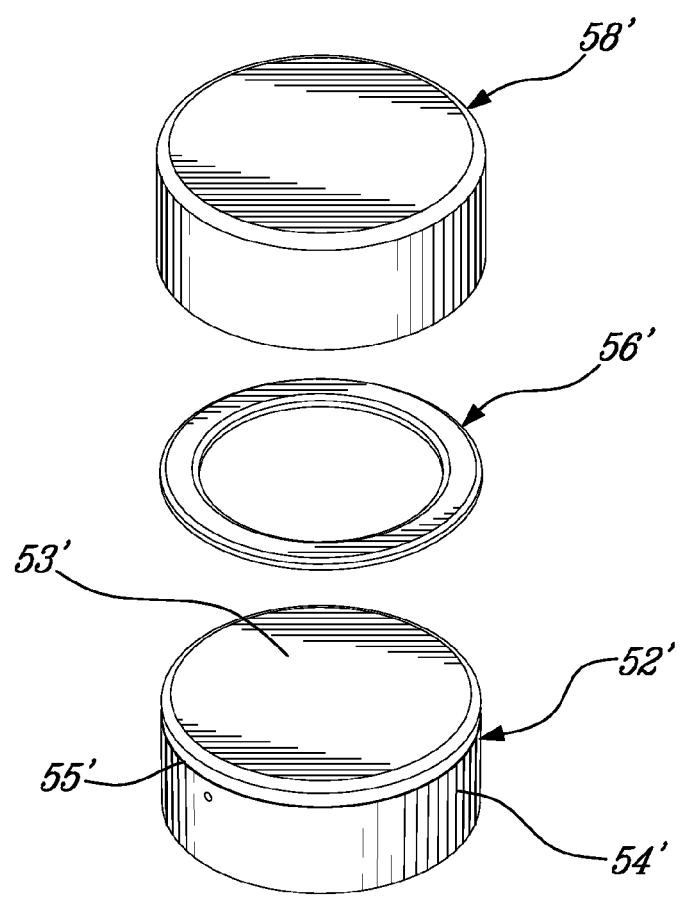
FIG. 11 is an exploded view of a piston body, a piston cover, and an attachment system according to a second embodiment.
Figure 12:
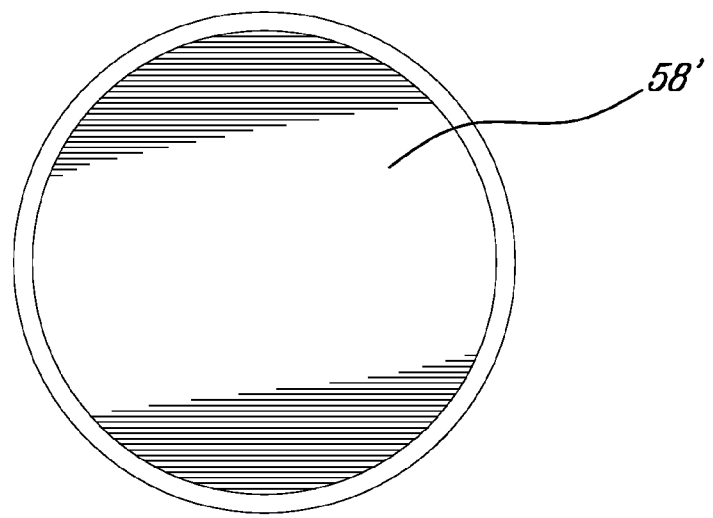
FIG. 12 is a top plan view of the piston cover of FIG. 11.

Turning now to FIGS. 11 and 12, a second embodiment of a piston head 34' will be described. Similarly to the piston head 34, the piston head 34' does not include apparent screw heads on a surface of the piston head 34' in contact with the inside 31a of the brewing chamber 31.

The piston head 34' has a piston body 52' similar to the piston body 52. The piston body 52' has a flat round top 53' and a cylindrical skirt 54' extending downwardly from the top 53'. The top 53' does not have apertures like the top 53 does. It is contemplated that the top 53' could have one or more apertures. The cylindrical skirt 54' includes an annular groove 55' similar to the annular groove 55. The annular groove 55' receives a silicone seal 56'. The seal 56' is similar to the seal 56.

A piston cover 58' similar to the piston cover 58 is mating tightly the piston body 52' and the seal 56'. The piston cover 58' does not have apertures on a top thereof like the piston cover 58. The piston cover 58' has a non-perforated top and is held onto the piston body 52' by suction. A top of the piston cover 58' constitutes a continuous surface. During assembly, the seal 56' is inserted into the annular groove 55' and the piston cover 58' is forced onto the piston body 52' and the seal 56'. Air escapes a region between the top 53' of the piston body 52' and the piston cover 58' thereby creating a suction which ensures that the piston cover 58' is biased toward the piston body 52'. Vacuum created between an inside of the piston cover 58' and an outside surface of the piston body 52' retains the piston cover 58' onto the piston body 52' even during use of the brewer module 14. With this arrangement, no holding plate, screws and washers are needed. It is contemplated that the annular groove 55' and the silicone seal 56' and that the piston cover 58' could be connected to the piston body 52' still by suction.

In view of the above, both piston heads 34 and 34' have a non-perforated or continuous flat top surface (the top surface 61 of the holding plate 60 in the case of the piston head 34, and the top surface of the piston cover 58' in the case of the piston head 34'). As such, no surfaces extending from the piston heads 34 and 34, such as screw heads, is in direct contact with the coffee, which in turn reduces possibility of dirt accumulation there.

Modifications and improvements to the above-described embodiments of the present may become apparent to those skilled in the art. The foregoing description is intended to be exemplary rather than limiting. The scope of the present is therefore intended to be limited solely by the scope of the appended claims.

I claim:

1. A piston head for a brewing chamber of a French press coffee maker, the piston head comprising:
   a piston body having a top portion and a skirt extending downwardly from the top portion, the top portion having a top surface and a bottom surface, the bottom surface being adapted to be pivotally connected to a piston rod;
   a piston cover mating at least a portion of the piston body, the piston cover having a top portion and a skirt extending downwardly from the top portion, the top portion having a top surface and a bottom surface, the bottom surface of the piston cover mating the top surface of the piston body, the skirt of the piston cover mating at least in part the skirt of the piston body;
   a holding plate connecting to the piston cover and the piston body, the holding plate having a continuous flat top surface, at least one hollow peg extending from a bottom surface of the holding plate through at least one aperture of the piston cover and through at least one aperture of the piston body, the at least one hollow peg securing the holding plate to the piston body, the top surface of the piston head being said continuous flat top surface of the holding plate, wherein said continuous flat top surface is adapted to be in contact with an inside of the brewing chamber;
   at least one screw being inserted in the at least one hollow peg for securing the holding plate to the piston body.

2. The piston head of claim 1, wherein the skirt of the piston body includes at least one groove; and
   further comprising a seal disposed at least in part in the at least one groove, the seal being disposed between the piston body and the piston cover.

3. The piston head of claim 1, wherein the piston body and piston cover are each generally circular.

4. The piston head of claim 1, further comprising an indentation on the skirt of the piston cover.

5. The piston head of claim 1, further comprising at least one washer disposed between the at least one screw and the bottom surface of the piston body.

6. The piston head of claim 1, wherein the top surface of the holding plate has a raised central portion.

7. The piston head of claim 1, wherein the at least one peg includes at least two pegs, the at least one aperture of the piston cover includes at least two apertures, and the at least one aperture of the piston body includes at least two apertures.

8. The piston head of claim 7, wherein the at least two pegs and the at least two apertures of the piston cover and piston body are disposed radially relative to a center of the holding plate.

9. An attachment system for connecting a piston cover to a piston body of a French press coffee maker, the attachment system comprising:
- a plate having a top surface and a bottom surface, the bottom surface of the plate being adapted to be in contact with a top surface of the piston cover, the bottom surface having at least one peg extending therefrom, the at least one peg being adapted to be inserted into at least one aperture of the piston cover and corresponding at least one aperture of the piston body, the at least one peg being adapted to be secured to the bottom surface of the piston body;
- at least one screw, the at least one screw being adapted to be inserted in the at least one peg for securing the holding plate to the piston body.

10. The attachment system of claim 9, further comprising at least one washer adapted to be disposed between the at least one screw and the piston body.

\* \* \* \* \*